(12) United States Patent
Ye

(10) Patent No.: US 11,832,759 B2
(45) Date of Patent: Dec. 5, 2023

(54) HEAT GENERATING ASSEMBLY

(71) Applicants: Xiushan Ye, Guangzhou (CN); GUANGZHOU SHENGWEI ELECTRIC MANUFACTURING CO., LTD., Guangzhou (CN)

(72) Inventor: Xiushan Ye, Guangzhou (CN)

(73) Assignees: Xiushan Ye, Guangzhou (CN); GUANGZHOU SHENGWEI ELECTRIC MANUFACTURING CO., LTD., Guangzhou (CN)

( * ) Notice: Subject to any disclaimer, the term of this patent is extended or adjusted under 35 U.S.C. 154(b) by 693 days.

(21) Appl. No.: 17/023,395

(22) Filed: Sep. 17, 2020

(65) Prior Publication Data

US 2021/0000291 A1 Jan. 7, 2021

Related U.S. Application Data

(63) Continuation of application No. PCT/CN2018/084269, filed on Apr. 24, 2018.

(30) Foreign Application Priority Data

Mar. 20, 2018 (CN) .......................... 201810230095.4

(51) Int. Cl.
*A47J 31/54* (2006.01)
*F24H 1/12* (2022.01)
(Continued)

(52) U.S. Cl.
CPC ................ *A47J 31/54* (2013.01); *A23F 5/26* (2013.01); *F24H 1/0018* (2013.01); *F24H 1/101* (2013.01);
(Continued)

(58) Field of Classification Search
CPC ...... A47J 31/04; A47J 31/057; A47J 31/0573; F24H 1/121; F24H 1/142; F28F 3/06; F28F 3/12
See application file for complete search history.

(56) References Cited

U.S. PATENT DOCUMENTS 4,888,465 A * 12/1989 Hoffmann ............. A47J 31/545
392/467
4,888,467 A * 12/1989 Hoffmann ............... A47J 31/56
219/505

(Continued)

FOREIGN PATENT DOCUMENTS

CN 201637067 U 11/2010
CN 203000581 U 6/2013
(Continued)

OTHER PUBLICATIONS

International search report, PCT/CN2018/084269, dated Dec. 24, 2018 (2 pages).
(Continued)

*Primary Examiner* — Reginald Alexander

(57) ABSTRACT

A heat generating assembly (13), aiming to solve the problem of low heating efficiency in the related art such as a coffee machine. The heat generating assembly (13) includes a water inlet (133), a water outlet (134), and a heat generating body (135) provided between the water inlet (133) and the water outlet (134). The heat generating body (135) includes a heating film (132), a bottom cover (131) for the heating film, the heating film (132) is capable of generating heat upon energization to heat liquid flowing through the heat generating body (135). The heat generating assembly (13) uses film-type heating technology, the heating efficiency is high and accurate control of temperature can be realized.

20 Claims, 4 Drawing Sheets

(51) Int. Cl.
*A23F 5/26* (2006.01)
*F24H 1/00* (2022.01)
*F24H 1/10* (2022.01)
*H05B 1/02* (2006.01)
*F24H 1/14* (2022.01)

(52) U.S. Cl.
CPC ........... *F24H 1/121* (2013.01); *H05B 1/0297* (2013.01); *F24H 1/142* (2013.01)

(56) References Cited

U.S. PATENT DOCUMENTS

| | | | |
|---|---|---|---|
| 5,557,704 A * | 9/1996 | Dennis | D06F 39/04 392/458 |
| 6,701,068 B2 | 3/2004 | Lin | |
| 2010/0199853 A1 * | 8/2010 | Blanc | H05B 3/50 99/323.3 |
| 2010/0282090 A1 * | 11/2010 | Etter | F24H 15/128 219/494 |
| 2011/0041705 A1 * | 2/2011 | Reichl | H05B 3/40 99/323.3 |

FOREIGN PATENT DOCUMENTS

| | | |
|---|---|---|
| CN | 203314757 U | 12/2013 |
| CN | 203424809 U | 2/2014 |
| CN | 106419583 A | 2/2017 |
| EP | 1529470 A1 | 5/2005 |
| WO | WO2016141562 A1 | 9/2016 |

OTHER PUBLICATIONS

Australian First Examination report, Australian Application No. 2018414777, dated Jul. 5, 2021(5 pages).
European search report, European Application No. 18911281.6, dated Apr. 12, 2020(7 pages).

* cited by examiner

HEAT GENERATING ASSEMBLY

CROSS-REFERENCE TO RELATED APPLICATIONS

The present application is a continuation-application of International (PCT) Patent Application No. PCT/CN2018/084269 filed on Apr. 24, 2018, which claims priority of Chinese Patent Application No. 201810230095.4, filed on Mar. 20, 2018 in the National Intellectual Property Administration of China, the contents of all of which are hereby incorporated by reference.

TECHNICAL FIELD

The present disclosure relates to the field of electrical products for brewing beverages such as coffee, and more particularly to a heat generating assembly for heating liquid flowing therethrough.

BACKGROUND

With the improvement of people's living standards, coffee beverages are beginning to be loved by people and become daily beverages for people, especially those who pursue quality of life. At present, methods of making coffee beverages mainly include: instant coffee brewing, brewing in a coffee machine by existing coffee powder, and ground coffee beans by a coffee machine and further brewing.

The above coffee machine usually has a heating device to heat water flowing through the heating device, and the heated hot water is poured onto the coffee powder to brew a coffee beverage.

The coffee machine in related art usually uses a tubular heating unit to heat the liquid flowing therethrough. This tubular heating unit generally is a common electrically heating tube, and usually utilizes a resistance heating coil. Because a contact area between such heating tube and a water channel is small and it is difficult to achieve a close fit between them, a heating efficiency is relatively low. Further, a part of such heating tube that is not in contact with the water channel is easy to radiate heat, causing a large heat loss. In addition, because it takes a certain time for the heat generation and heat dissipation of the heating tube itself, it is not easy to accurately control the temperature of hot water to be provided.

Therefore, it is necessary to provide a heat generating assembly that can at least partially overcome the above disadvantages.

SUMMARY

An aspect of the present disclosure provides a heat generating assembly, which includes a water inlet, a water outlet, and a heat generating body provided between the water inlet and the water outlet, wherein the heat generating body includes a heating film, a bottom cover for the heating film, and a protective cover for the heating film, the heating film is placed in the protective cover and capable of generating heat upon energization to heat water flowing through the heat generating body.

BRIEF DESCRIPTION OF THE DRAWINGS

The present disclosure can be described in more detail through embodiments with reference to the accompanying drawings, wherein the accompanying drawings are not drawn to scale.

DETAILED DESCRIPTION

Figure 1:
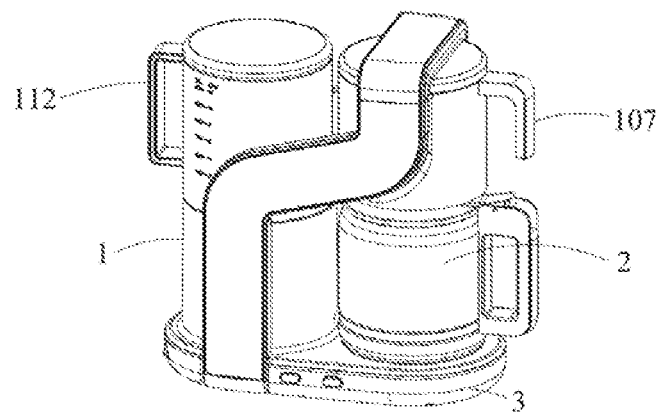
FIG. 1 is a schematic, assembled perspective view of a coffee machine according to an embodiment of the present disclosure.

The present disclosure will be described in more detail below in conjunction with specific embodiments. Those skilled in the art should understand that, this description only lists some specific embodiments of the present disclosure and do not limit the present disclosure and its protection scope.

In addition, in order to easily describe relationship between one part and another part shown in the drawings, spatial relative terms such as "lower", "upper" and similar terms are used herein. It should be understood that, the spatial relative terms are intended to cover different orientations of a device in use and operation other than the orientation depicted in the drawings. For example, if the device in the drawings is turned upside down, a component described as being "lower" relative to another component may then be oriented to be "upper" relative to another component.

Figure 2:
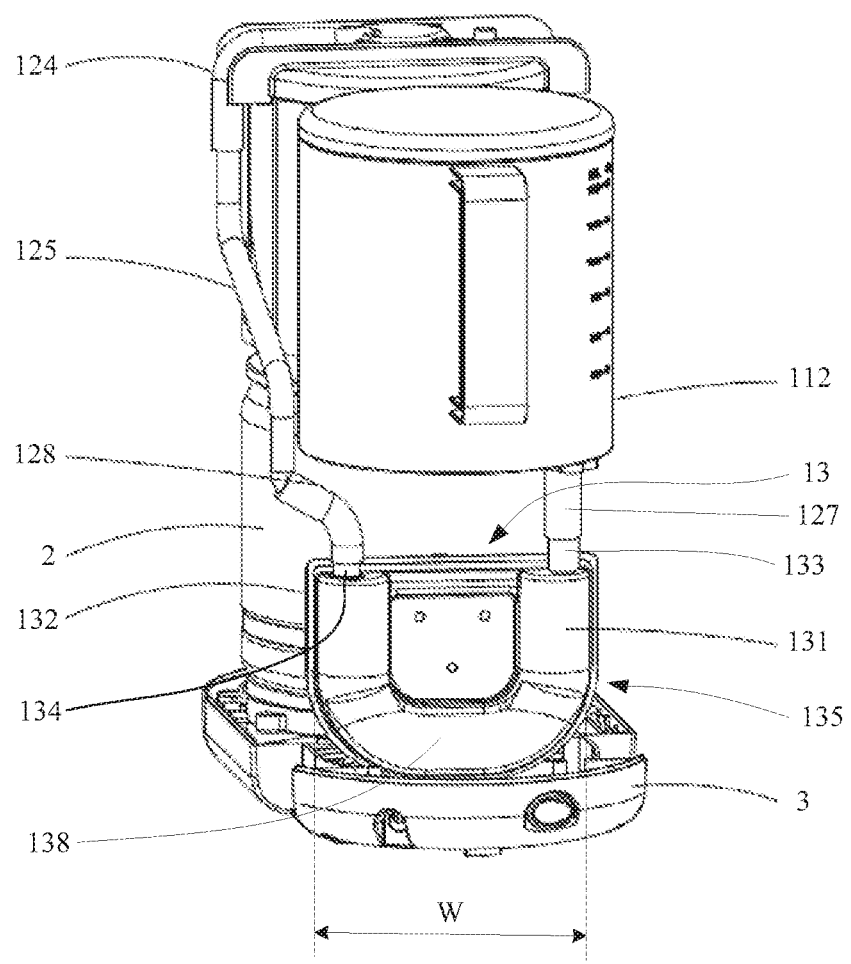
FIG. 2 is a schematic, assembled perspective view of the coffee machine shown in FIG. 1 from another view angle.

FIGS. 1-2 show assembled perspective views of a coffee machine according to an embodiment of the present disclosure. The coffee machine mainly includes a machine body 1, a water cup 112, a heat generating assembly 13, a coffee powder box 107, a base 3 and a glass cup 2.

As can be seen from FIG. 2, a water inlet 133 of a U-shaped bottom cover 131 for a heating film can communicate with the water cup 112 by means of a water inlet silicone tube 127. A water outlet 134 of the bottom cover for the heating film can transfer hot water to a funnel through a water outlet silicone tube 128, a water pipe 125, and a water outlet silicone tube 124.

Figure 3:
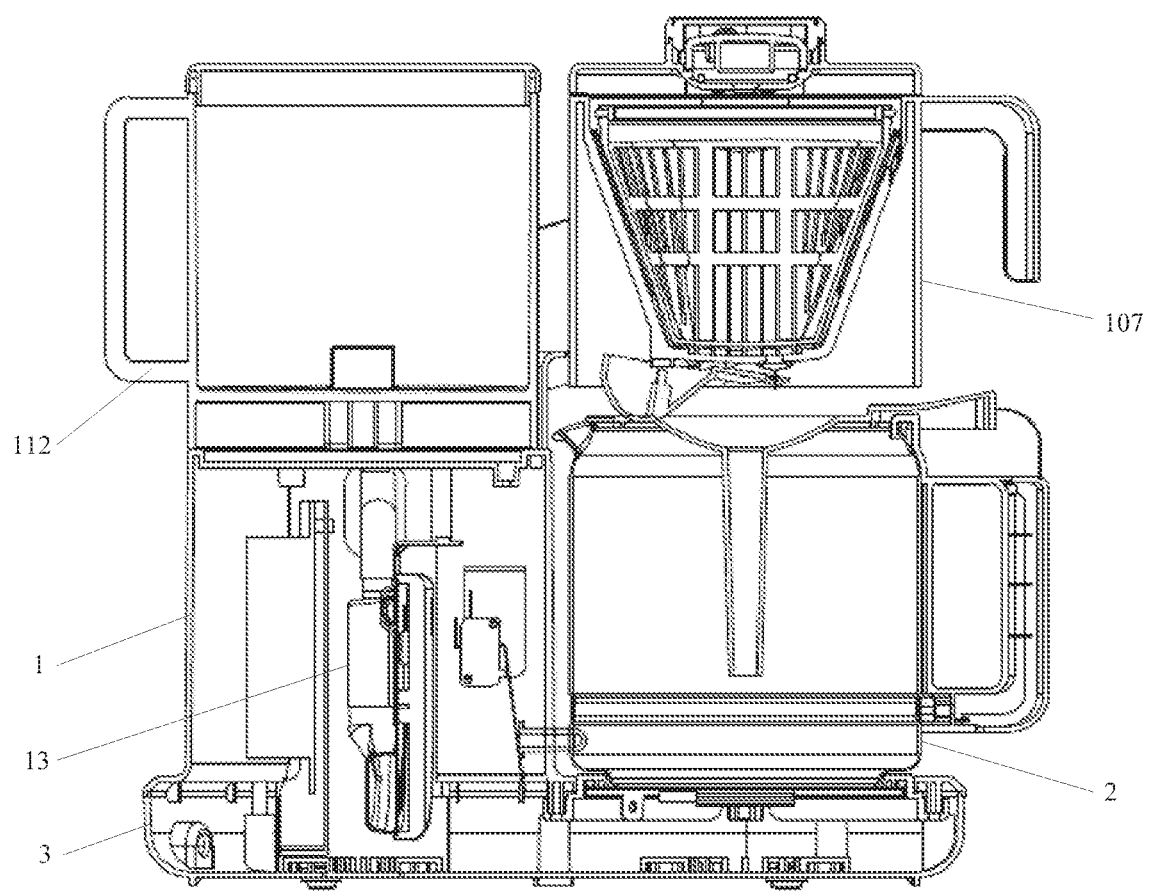
FIG. 3 is a schematic cross-sectional view of the coffee machine shown in FIG. 1.
Figure 4:
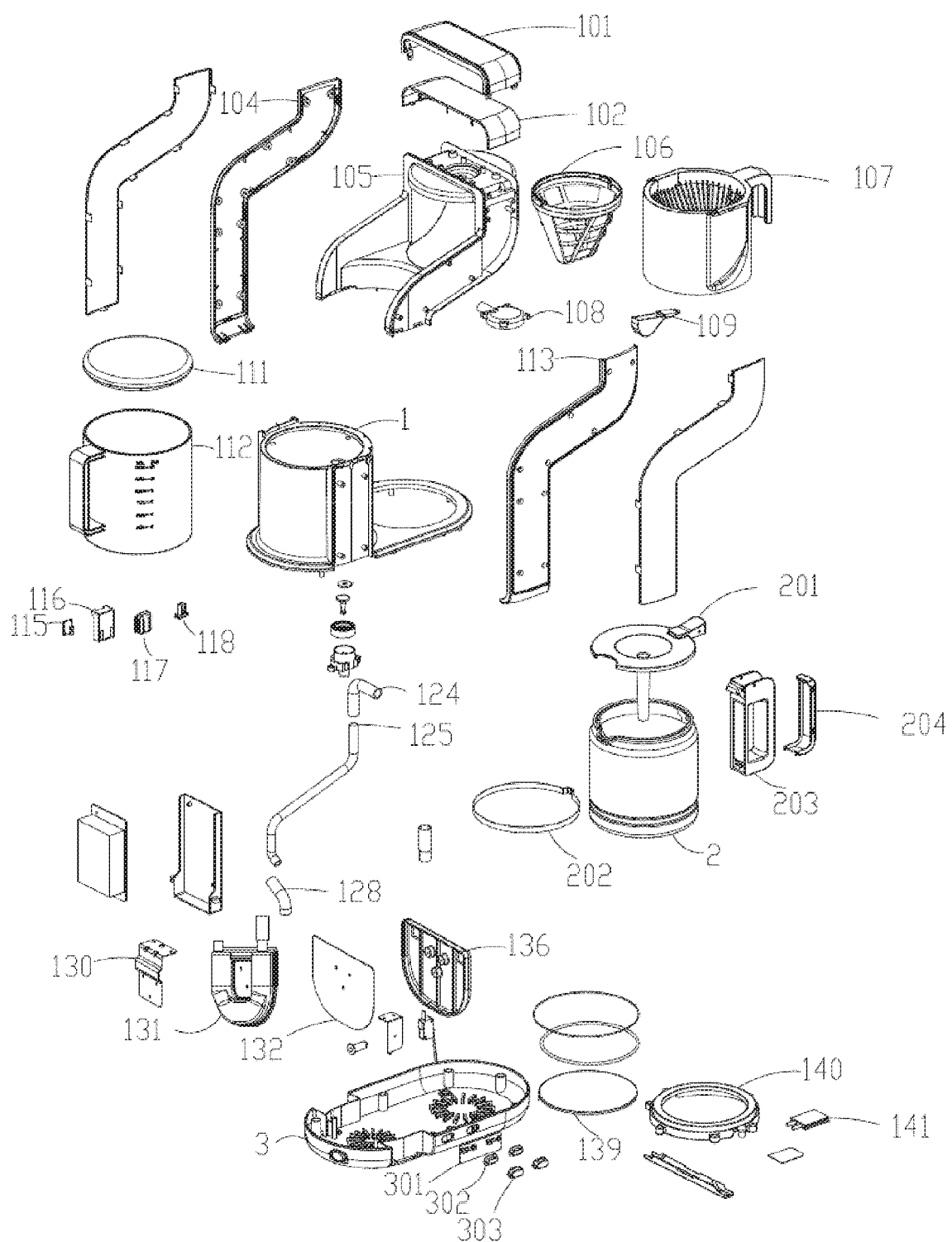
FIG. 4 is a schematic, exploded perspective view of main portion of the coffee machine shown in FIG. 1.

Also referring to FIGS. 3 and 4, the machine body 1 may include an upper cover 101, an upper bracket 105, a fuselage body, and the like. The upper cover 101 may include a decorative sheet 102. The upper bracket 105 may include a left cover 104 and a right cover 113 cover. The coffee powder box 107 is connected to the machine body 1 and the base 3 by means of the upper cover 101 and the upper bracket 105. Various components of the machine body are combined to form various accommodation spaces and installation positions in order to accommodate or install various necessary components of the coffee machine. Of course, the machine body 1 can also take other forms, such as a two-piece type, as long as it can achieve the purpose of accommodation or installation described above.

The base 3 is disposed at the bottom of the machine body 1, and a fixing block 140 of a bottom heating plate may be provided in the base 3. A PTC (Positive Temperature Coefficient) heater 141 and the like may be provided at the fixing block 140. The heater is mainly used to heat and keep the coffee beverage in the glass cup 2 warm. On the outside of the base 3, a lamp PCB (Printed Circuit Board) 301, buttons 302 and silicone buttons 303 can also be provided.

The water cup 112 may include a cup body, a cup cover 111, a sealing portion, and the like. The water cup 112 can be placed on the machine body 1 and used to provide water to be heated. When the water cup 112 is lifted from the machine body 1, the sealing portion is used to seal the bottom of the water cup 112 to avoid water leakage; and when the water cup 112 is placed on the machine body 1, the sealing portion is opened and water is supplied to the heat generating assembly 13. At the machine body 1, a magnet box 118 is fixed via a magnet box fixing frame 116, and the magnet box 118 is accommodated in a magnet box cover 117. A Hall element 115 may be provided at the magnet box fixing frame 116. A small magnet is installed in the magnet box 118 so as to control the opening or closing of the sealing portion via magnetic action.

A coffee powder box 107 is installed on the machine body 1, and a funnel 106, a water outlet 134 box 108, a drain valve 109 and the like can be provided in the coffee powder box 107. The funnel 106 is used for containing coffee powder and for receiving hot water heated by the heat generating assembly 13, so that the coffee powder is brewed by the received hot water.

The glass cup 2 can be placed on the base 3, and is used to collect brewed coffee. The glass cup 2 can be a glass container, a ceramic container, a metal container, or the like. The glass cup 2 may include a cup cover 201, a holder 202, a cup handle 203, and a handle cover 204. The holder 202 is configured to be fixed on the body of the glass cup 2, and further connect to the cup handle 203. The glass cup 2 can be fixed on the base 3 via a support plate 139.

Figure 5:
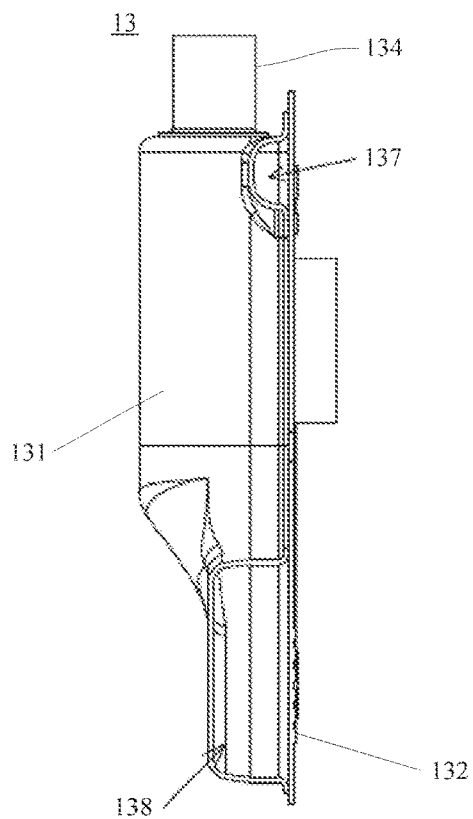
FIG. 5 is a side view of a heat generating assembly of the coffee machine according to an embodiment of the present disclosure.
Figure 6:
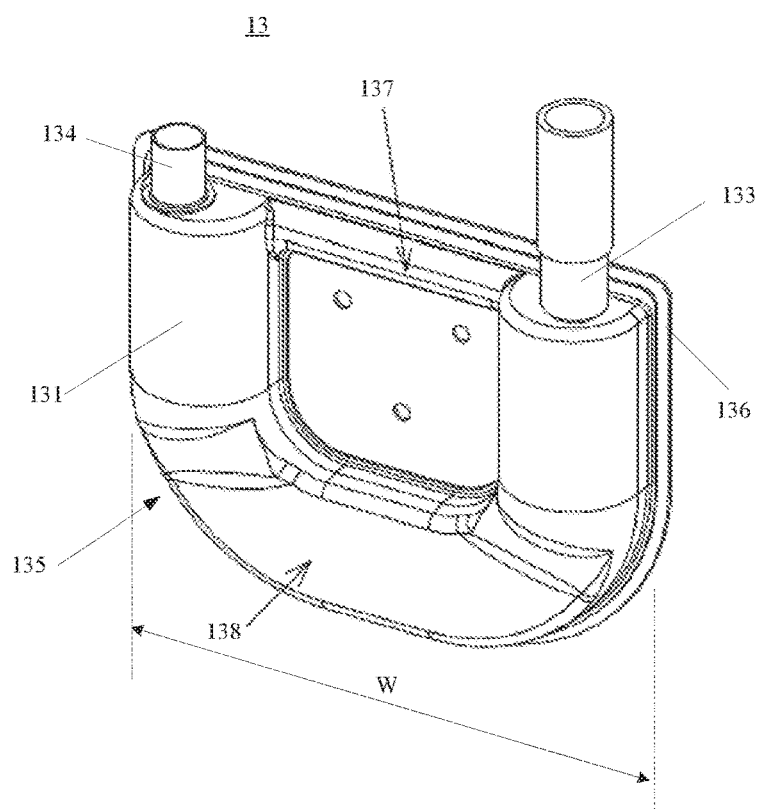
FIG. 6 is a schematic perspective view of the heat generating assembly shown in FIG. 5.

Referring to FIGS. 4, 5 and 6, the heat generating assembly 13 is installed in the machine body 1, and is used to heat the water provided by the water cup 112. The heat generating assembly 13 includes a water inlet 133, a water outlet 134, and a heat generating body 135 provided between the water inlet 133 and the water outlet 134. The heat generating body 135 includes a heating film 132, a bottom cover 131 for the heating film 132, and a protective cover 136 for the heating film 132. The bottom cover 131 may be fixed to the heating film 132 so as to form a water channel. The heating film 132 is placed in the protective cover 136 and can generate heat when it is energized, so as to heat the water flowing through the heat generating body 135. In a preferred embodiment, an overall shape of the heat generating assembly 13 of the coffee machine of the present disclosure may be U-shaped, so that the water inlet 133 and the water outlet 134 are located at the same height.

According to a preferred embodiment, the heat generating body 135 may have a U-shaped heating film 132, a U-shaped bottom cover 131, and a U-shaped protective cover 136. The shape of the protective cover generally corresponds to the shape of the heating film 132. The U-shaped heating film 132 is placed in the U-shaped protective cover 136 and can generate heat when it is energized, so as to heat the water flowing through the heat generating body 135. The U-shaped bottom cover 131 and the U-shaped protective cover 136 are connected by a heating film fixing member 130. According to a preferred embodiment, an exhaust passage 137 may be provided in an upper portion of the U-shaped bottom cover 131. The exhaust passage 137 is provided between the water inlet 133 and the water outlet 134. When the water is supplied, the exhaust passage 137 will discharge the air from the water inlet 133 to the water outlet 134, thereby preventing the air from being blocked in the water inlet 133; otherwise, the water cannot flow out well from the water cup and may cause the heating film 132 to dry burn. According to another preferred embodiment, a recess 138 may be provided at a lower portion of the U-shaped bottom cover 131, and this recess 138 can prevent excessive water storage in the bottom cover. Preferably, the recess 138 extends over most of the width W of the bottom cover 131.

The coffee machine of the present disclosure may further include other necessary components to realize its function, and these components are well known to those skilled in the art, and will not be described in detail herein.

The above description is only used to exemplarily describe the present disclosure, not to limit the present disclosure. It should be pointed out that, for those of ordinary skill in the art, several improvements, modifications, and variations can be made to the present disclosure, but these improvements, modifications and variations should be regarded as falling within the scope of the present disclosure without departing from the spirit of the present disclosure.

The invention claimed is:

1. A heat generating assembly (13), comprising a water inlet (133), a water outlet (134), and a heat generating body (135) provided between the water inlet (133) and the water outlet (134), wherein the heat generating body (135) comprises a heating film (132), a bottom cover (131) for the heating film (132), and a protective cover (136) for the heating film (132), the heating film (132) is placed in the protective cover (136) and capable of generating heat upon energization to heat water flowing through the heat generating body (135), wherein an exhaust passage (137) is provided in an upper portion of the bottom cover (131).

2. The heat generating assembly (13) according to claim 1, wherein the heating film (132) is sheet-shaped and has an outer contour in a U shape.

3. The heat generating assembly (13) according to claim 1, wherein a shape of the protective cover (136) substantially corresponds to a shape of the heating film (132).

4. The heat generating assembly (13) according to claim 1, wherein the heat generating body (135) has an overall U shape, such that the water inlet (133) and the water outlet (134) are at the same height.

5. The heat generating assembly (13) according to claim 1, wherein the exhaust passage (137) is provided between the water inlet (133) and the water outlet (134).

6. The heat generating assembly (13) according to claim 1, wherein a recess (138) is provided at a lower portion of the bottom cover (131).

7. The heat generating assembly (13) according to claim 6, wherein the recess (138) extends over most of the width (W) of the bottom cover (131).

8. The heat generating assembly (13) according to claim 1, wherein outer contours of the bottom cover (131) and the protective cover (136) substantially coincide with each other, and the bottom cover (131) and the protective cover (136) are connected by a fixing member (130).

9. The heat generating assembly (13) according to claim 8, wherein the bottom cover (131), the heating film (132), and the protective cover (136) are coupled to each other by a bolt to fix the heating film (132) to the protective cover (136).

10. A heat generating assembly (13), comprising a liquid inlet (133), a liquid outlet (134), and a heat generating body (135) provided between the liquid inlet (133) and the liquid outlet (134), wherein the heat generating body (135) comprises a heating film (132), a bottom cover (131) and a protective cover (136), the bottom cover (131) is fixed to a side of the heating film (132) so as to form a liquid channel, the heating film (132) is placed in the protective cover (136) and capable of generating heat upon energization to heat liquid flowing through the heat generating body (135), wherein an exhaust passage (137) is provided in an upper portion of the bottom cover (131).

11. The heat generating assembly (13) according to claim 10, wherein the heating film (132) is sheet-shaped and has an outer contour in a U shape.

12. The heat generating assembly (13) according to claim 10, wherein the heat generating body (135) has an overall U shape, such that the liquid inlet (133) and the liquid outlet (134) are at the same height.

13. The heat generating assembly (13) according to claim 10, wherein the exhaust passage (137) is provided between the liquid inlet (133) and the liquid outlet (134).

14. The heat generating assembly (13) according to claim 10, wherein a recess (138) is provided at a lower portion of the bottom cover (131).

15. The heat generating assembly (13) according to claim 14, wherein the recess (138) extends over most of the width (W) of the bottom cover (131).

16. The heat generating assembly (13) according to claim 10, wherein outer contours of the bottom cover (131) and the protective cover (136) substantially coincide with each other, and the bottom cover (131) and the protective cover (136) are connected by a fixing member (130).

17. The heat generating assembly (13) according to claim 16, wherein the bottom cover (131), the heating film (132), and the protective cover (136) are coupled to each other by a bolt to fix the heating film (132) to the protective cover (136).

18. A coffee machine, comprising:
a machine body (1); and
a heat generating assembly (13) installed in the machine body (1), wherein the heat generating assembly (13) comprises a liquid inlet (133), a liquid outlet (134), and a heat generating body (135) provided between the liquid inlet (133) and the liquid outlet (134), wherein the heat generating body (135) comprises a heating film (132), a bottom cover (131) and a protective cover (136), the bottom cover (131) is fixed to a side of the heating film (132) so as to form a liquid channel, the heating film (132) is placed in the protective cover (136) and capable of generating heat upon energization to heat liquid flowing through the heat generating body (135), wherein an exhaust passage (137) is provided in an upper portion of the bottom cover (131).

19. The coffee machine according to claim 18, wherein the exhaust passage (137) is provided between the liquid inlet (133) and the liquid outlet (134).

20. The coffee machine according to claim 18, wherein outer contours of the bottom cover (131) and the protective cover (136) substantially coincide with each other, and the bottom cover (131) and the protective cover (136) are connected by a fixing member (130), and
wherein the bottom cover (131), the heating film (132), and the protective cover (136) are coupled to each other by a bolt to fix the heating film (132) to the protective cover (136).

* * * * *